July 2, 1957
B. BARÉNYI ET AL
2,797,952
MULTI-UNIT MOTOR VEHICLE BODY HAVING
OVERLAPPING MARGINAL BODY PORTIONS
Filed Dec. 9, 1952
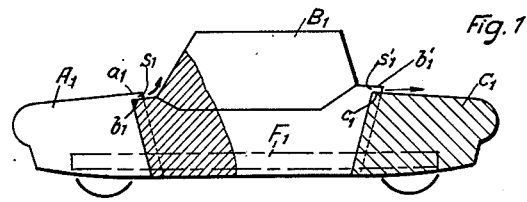
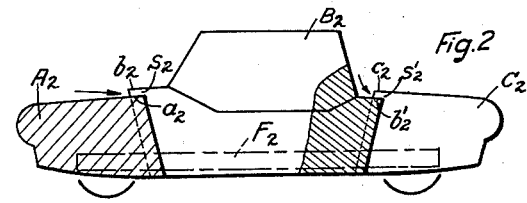
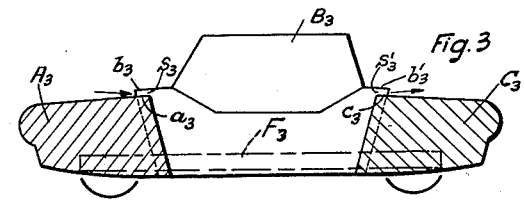
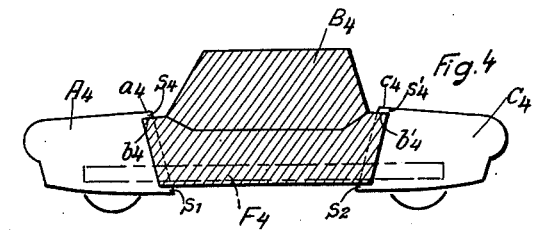
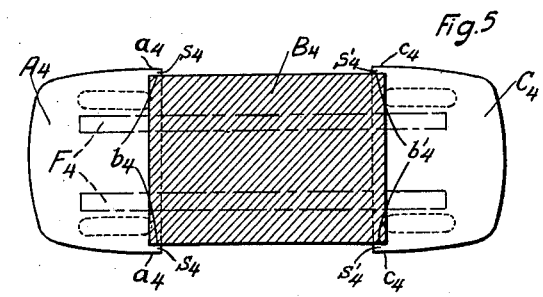
Inventors
Béla Barényi
Karl Wilfert
by Hicke and Padlon
Attorneys 0# United States Patent Office 2,797,952
Patented July 2, 1957

2,797,952
MULTI-UNIT MOTOR VEHICLE BODY HAVING OVERLAPPING MARGINAL BODY PORTIONS

Béla Barényi, Stuttgart-Rohr, and Karl Wilfert, Stuttgart-Degerloch, Germany, assignors to Daimler-Benz Aktiengesellschaft, Stuttgart-Unterturkheim, Germany Application December 9, 1952, Serial No. 324,942

Claims priority, application Germany December 10, 1951

7 Claims. (Cl. 296—28)

The present invention relates to the structure of motor vehicles, especially of the cellular type, and, more particularly, to vehicle bodies composed of separate units or cells in which the end units are produced separately from the middle units. The present invention resides in providing separate units or cells with bodies of different cross-sections, each unit extending over or into the other unit substantially rectilinearly, so that definite steps or discontinuities are produced in the places where the units overlap with each other and so that in a zone extending over approximately three-quarters of the periphery the edges of the end unit and the edges of the middle unit are mounted in overlapping relationship.

The present invention has the advantage that no accurate fit is required between the individual body units since such fit in prior structures required expensive and complicated production means. The middle unit and the end unit contact one another or are flush with one another at one of the edges only, for instance at the bottom or near the frame. Therefore, any twisting, warping or flexion of the frame or of the body causes the body units to freely move relative to one another without producing undesirable noises and without being subject to any undesirable stresses. The gap left between two adjoining units may be used for air conditioning and heating purposes. For that purpose fresh air heated in the motor compartment may be conducted, for instance, towards the windshield to de-frost the same or fresh air may be permitted to flow through the gap into the interior of the body.

Further objects, features and advantages of the present invention will become more obvious from the following description when taken in connection with the accompanying drawing which shows, for purposes of illustration only, several embodiments in accordance with the present invention and wherein Figure 1 is a diagrammatic longitudinal cross-sectional view through one embodiment of a motor vehicle in accordance with the present invention;

Figure 2 is a diagrammatic longitudinal cross-sectional view through another embodiment of a motor vehicle in accordance with the present invention;

Figure 3 is a diagrammatic longitudinal cross-sectional view through still another embodiment of a motor vehicle in accordance with the present invention;

Figure 4 is a diagrammatic longitudinal cross-sectional view through still a further embodiment of a motor vehicle in accordance with the present invention, and Figure 5 is a diagrammatic top plan view of the motor vehicle in accordance with the present invention.

Referring now more particularly to the drawing, wherein like reference characters with appropriate suffixes are used in the various views thereof to designate corresponding parts, the vehicle body is composed, generally speaking, of a front unit or cell A, of a middle unit or cell B, and of a tail unit or cell C. The individual units or cells may be formed by hollow metal bodies, and the vehicle may be of the cellular construction. The axle transmission unit or the entire driving unit, including the engine, may be accommodated in one of the end body units or cells which itself is detachable from the middle unit or cell B.

However, the body only may be subdivided, while the chassis together with the front axle unit and the rear axle unit, or with only one of these axle units, may be assembled to constitute a unitary subassembly on which the various body units or only one of such body units, such as, for example, the front unit A or tail unit C only may be subsequently mounted.

As shown in the drawings, the edges $a$ of the front unit A overlap the front edges $b$ of the middle unit. Similarly, the front edges $c$ of the tail unit overlap the rear edges $b'$ of the middle unit B, gaps $s$ and $s'$ remaining therebetween. The gap extends approximately over three-quarters of the periphery of the body or, if desired, over the entire periphery of the body as shown, for instance, in the embodiment of the invention illustrated in Figs. 4 and 5. In the latter case the connection of the units is effected only by the chassis frame schematically illustrated in the various views and designated by F which connects the front axle unit with the rear axle unit (not shown). The frame F may be of any suitable construction of conventional nature and may be secured to the various body units or cells by conventional means such as bolting, welding, etc.

In the embodiment shown in Fig. 1, in connection with which the suffix 1 is used, the margin $a_1$ overlies the margin $b_1$, thereby permitting heated air from the engine compartment provided within the front unit A to be conducted towards the windshield pane of the vehicle. Similarly, the margin $b_1'$ overlies the margin $c_1$, thereby affording a possibility to provide for ventilation of the interior of the body.

In the embodiment illustrated in Fig. 2 the margin $b_2$ overlies the margin $a_2$, whereby fresh air may directly enter from the outside through the gap $s_2$ into the interior space of the body. Similarly, at the rear margin $c_2$ of the tail unit sheet metal walls $C_2$ overlies the margin $b_2'$ of the middle unit $B_2$. That is particularly advantageous where a rear driving motor is disposed within the tail unit $C_2$ as cooling air may enter the motor space $C_2$ in the direction of the arrow through the gap $s_2'$.

In the embodiment shown in Fig. 3 the gap $s_3$ is formed in a manner similar to that shown in Fig. 2 whereas the gap $s_3'$ is formed in a manner similar to that shown in Fig. 1. With this body construction, a particularly effective ventilation of the body space is attainable.

In the embodiment shown in Figs. 1, 2 and 3 the gap $s$ and $s'$ extends over the top and the sides of the body only, whereas at the bottom of the body the units contact each other, for instance, within the vicinity of the frame F with which they are connected in any suitable manner as by bolting, welding, etc.

This construction involves the advantage that the body units or cells are connected at such points where the neutral zone is located, when the chassis frame is flexed or twisted. As a result, the joint of the edges of the body units located at the bottom thereof act in the manner of a resilient hinge permitting the top portions of the body units to freely perform considerable relative movements.

In Fig. 4 an embodiment of the invention is illustrated, in which the margin $a_4$ of the front unit $A_4$ overlies the margin $b_4$ of the middle unit $B_4$, the margin $c_4$ of the tail unit $C_4$ overlying the margin $b_4'$ of the middle unit $B_4$ in a similar manner. In this event, the gap between the marginal portions of the sheet metal units extends around the entire periphery of the body. The chassis frame F of any suitable conventional type may again be secured to the various units or cells in such a manner that the marginal portions of the various cells are disposed in telescopic overlapping relationship whereby the marginal portions are so spaced as to form a gap therebetween.

The end units A and C are made of different cross-sections over a substantial part thereof, as clearly shown in Figures 1 through 5 of the various embodiments in accordance with the present invention. Furthermore, since the end units are made of different cross-sections over a substantial part thereof with the outer contours thereof approximately or substantially rectilinearly, the discontinuities are encountered only in the places of overlap between the various sections where definite steps are produced. Thus, any inaccuracies of the manufacture of the various units cannot be determined visually.

Of course, all other combinations are possible and, if desired, the arrangement may be so chosen that the gap between a middle unit and an end unit is so shaped that parts of the marginal portions of the middle unit overlap the marginal portions of the end unit on part of the periphery on the outside and on the balance of the periphery on the inside.

What we claim is:

1. A motor vehicle body comprising a plurality of units with body portions enclosing the units and including a middle unit forming the passenger compartment and at least one end unit, the latter being adapted to be produced separately from the middle unit, each unit forming a fixedly attached substantial body part of the vehicle and having marginal body portions mounted in overlapping relationship to the marginal body portions of the adjacent body unit, overlapping marginal body portions forming a gap therebetween extending over at least about three-quarters of the periphery of the body in the transverse cross-sectional plane through the overlap, adjacent units having slightly different cross-sections extending substantially rectilinearly over a considerable part near the overlapping ends thereof so as to provide a definite step at each point of overlap, said step forming said gap.

2. Motor vehicle body as claimed in claim 1, in which said units are attached to a common chassis frame, the bottom of the middle unit being flush with the bottom of the end unit at least in the vicinity of said frame.

3. Motor vehicle body as claimed in claim 1, in which said gap communicates with the interior of the body whereby air may enter said body through said gap for air conditioning purposes.

4. Motor vehicle body as claimed in claim 1, in which said middle unit is provided with a front edge overlying the rear edge of said end unit constituting the front unit of the vehicle whereby the gap therebetwen opens forwardly for the admission of outside air to the interior of said middle unit.

5. A motor vehicle body comprising a middle unit forming the passenger compartment and at least one end unit, the latter being adapted to be produced separately from the middle unit, each unit forming a fixedly attached part of the vehicle and having marginal portions mounted in overlapping relationship to the marginal portions of the adjacent body unit, overlapping marginal portions forming a gap therebetween over at least about three-quarters of the periphery of said body, adjacent units having different cross-sections extending substantially rectilinearly over a considerable part near the overlapping ends thereof so as to provide a definite step at each point of overlap, said step forming said gap, said end unit constituting the front unit forming the motor compartment for the vehicle, the rear marginal portion of said front unit overlying the front marginal portion of said middle unit, said middle unit being provided with a windshield pane located behind said rear marginal portion to be flushed by heated air leaving said engine compartment through said gap.

6. A motor vehicle body comprising a middle cell formed by a hollow sheet metal structure, end cells also formed by hollow sheet metal structures, said hollow sheet metal structures each forming a substantial portion of the outer vehicle body and adapted upon assembly of the cells to complete the main parts of the vehicle body, and means for mounting said cells with the marginal portions of adjacent cells in telescopic overlapping relationship, adjacent cells having hollow sheet metal structures of slightly different cross-sections in the respective transverse cross-sectional planes of overlap to thereby space overlapping marginal portions from each other in said planes and provide a gap therebetween, and the hollow sheet metal structures of adjacent cells extending substantially rectilinearly over a considerable part near the overlapping ends thereof so as to provide definite steps at the points of overlap.

7. A motor vehicle according to claim 6, wherein the marginal portion of said middle cell comprises sections located on the outside of an adjacent end cell and sections located inside of an adjacent end cell.

References Cited in the file of this patent

UNITED STATES PATENTS

| 1,099,798 | Harper | June 9, 1914 |
| 1,274,872 | Gordon | Aug. 6, 1918 |
| 1,610,466 | Oversmith | Dec. 14, 1926 |

FOREIGN PATENTS

| 486,968 | Great Britain | June 14, 1938 |
| 491,383 | Great Britain | Sept. 1, 1938 |
| 506,845 | Great Britain | June 6, 1939 |